United States Patent
Harada

(10) Patent No.: US 11,646,686 B2
(45) Date of Patent: May 9, 2023

(54) CONTROLLER FOR AC ROTARY ELECTRIC MACHINE

(71) Applicant: Mitsubishi Electric Corporation, Tokyo (JP)

(72) Inventor: Shingo Harada, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 0 days.

(21) Appl. No.: 17/536,529

(22) Filed: Nov. 29, 2021

(65) Prior Publication Data

US 2022/0247337 A1 Aug. 4, 2022

(30) Foreign Application Priority Data

Feb. 4, 2021 (JP) .............................. JP2021-016204

(51) Int. Cl.
*H02P 21/14* (2016.01)
*H02P 21/18* (2016.01)
*H02P 25/022* (2016.01)

(52) U.S. Cl.
CPC ............ *H02P 21/141* (2013.01); *H02P 21/18* (2016.02); *H02P 25/022* (2013.01); *H02P 2207/05* (2013.01)

(58) Field of Classification Search
CPC ...... H02P 21/141; H02P 21/18; H02P 25/022; H02P 2207/05; H02P 21/0017
See application file for complete search history.

(56) References Cited

U.S. PATENT DOCUMENTS

| | | | | |
|---|---|---|---|---|
| 2003/0015987 A1* | 1/2003 | Cheong | .................. | H02P 21/14 |
| | | | | 318/701 |
| 2003/0094917 A1* | 5/2003 | Garrigan | ................. | H02P 9/305 |
| | | | | 318/700 |
| 2015/0295530 A1* | 10/2015 | Park | ........................ | H02P 21/26 |
| | | | | 318/400.02 |

FOREIGN PATENT DOCUMENTS

JP 4161064 B2 10/2008

OTHER PUBLICATIONS

Office Action dated Mar. 29, 2022 in Japanese Application No. 2021-016204.

* cited by examiner

*Primary Examiner* — Bickey Dhakal
(74) *Attorney, Agent, or Firm* — Sughrue Mion, PLLC; Richard C. Turner

(57) ABSTRACT

To provide a controller for AC rotary electric machine which can control considering the interlinkage fluxes of first-axis and second-axis which change mutually according to the currents of first-axis and second-axis, such as d-axis and q-axis. A controller for AC rotary electric machine calculates interlinkage flux model response values of first-axis and second-axis by performing a response delay processing of a model response to the interlinkage flux command values of first-axis and second-axis; and calculates voltage command values of first-axis and second-axis which make interlinkage fluxes of first-axis and second-axis change to the interlinkage flux model response values of first-axis and second-axis in a feedforward manner, based on the interlinkage flux model response values of first-axis and second-axis, and the electrical angle speed.

15 Claims, 8 Drawing Sheets

FIG. 11    TWO-AXIS VOLTAGE COMMAND CALCULATION UNIT
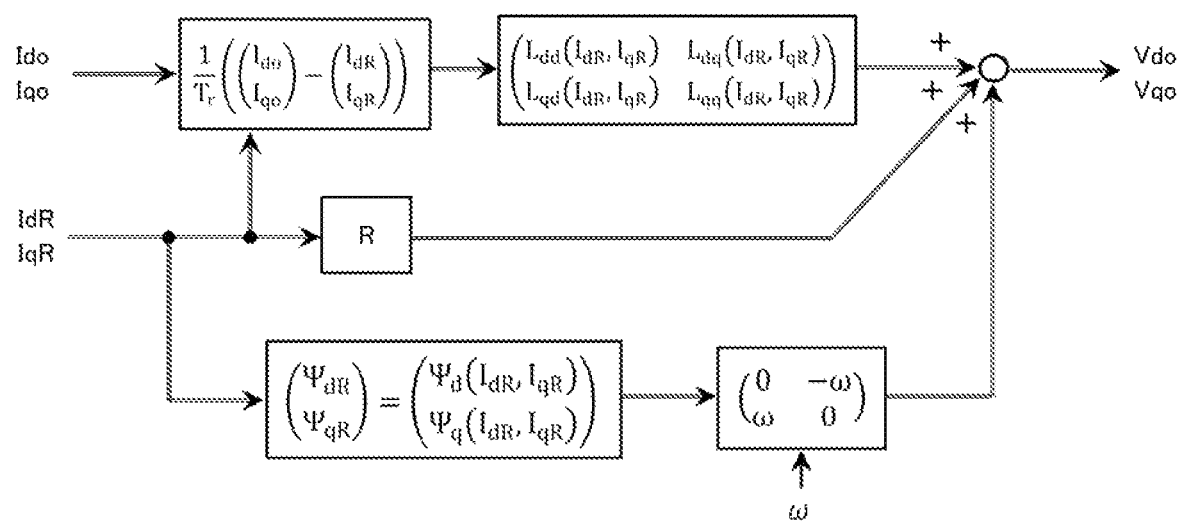

CONTROLLER FOR AC ROTARY ELECTRIC MACHINE

INCORPORATION BY REFERENCE

The disclosure of Japanese Patent Application No. 2021-16204 filed on Feb. 4, 2021 including its specification, claims and drawings, is incorporated herein by reference in its entirety.

BACKGROUND

The present disclosure relates to a controller for AC rotary electric machine.

Previously, as the control method of the AC rotary electric machine, the method of calculating the voltage command values of dq-axis using the model response of the current command value and the current on the dq-axis rotating coordinate system without using the obtained value of current is known. Herein, this method is called as the current feedforward control. In the current feedforward control, the voltage command values of dq-axis is calculated using the d-axis inductance Ld and the q-axis inductance Lq.

SUMMARY

However, in the rotary electric machine which generates the reluctance torque, the interlinkage flux component which is generated by the rotor core having nonlinear magnetic saturation characteristics exists. The interlinkage flux of d-axis changes not only with the current of d-axis but also with the current of q-axis, and the interlinkage flux of q-axis changes not only with the current of q-axis but also with the current of d-axis.

Accordingly, by the method described in JP 4161064 B, the interlinkage flux of d-axis which changes according to the current of d-axis, and the interlinkage flux of q-axis which changes according to the current of q-axis can be considered, but the interlinkage flux of d-axis which changes according to the current of q-axis, and the interlinkage flux of q-axis which changes according to the current of d-axis cannot be considered. Therefore, there was a problem that control accuracy is deteriorated.

Then, the purpose of the present disclosure is to provide a controller for AC rotary electric machine which can control considering the interlinkage fluxes of first-axis and second-axis which change mutually according to the currents of first-axis and second-axis, such as d-axis and q-axis.

A first controller for AC rotary electric machine according to the present disclosure that controls an AC rotary electric machine which is provided with armature windings of n phases (n is a natural number greater than or equal to two) via an inverter, the controller for AC rotary electric machine including:

a rotation detection unit that detects or estimates an electrical angle and an electrical angle speed of a rotor of the AC rotary electric machine;

an interlinkage flux command calculation unit that calculates interlinkage flux command values of a first-axis and a second-axis on a two-axis rotating coordinate system consisting of the first-axis and the second-axis which rotates synchronizing with rotation of the electrical angle of the rotor;

an interlinkage flux model response calculation unit that calculates interlinkage flux model response values of the first-axis and the second-axis by performing a response delay processing of a model response to the interlinkage flux command values of the first-axis and the second-axis;

a two-axis voltage command calculation unit that calculates voltage command values of the first-axis and the second-axis which make interlinkage fluxes of the first-axis and the second-axis change to the interlinkage flux model response values of the first-axis and the second-axis in a feedforward manner, based on the interlinkage flux model response values of the first-axis and the second-axis, and the electrical angle speed;

an AC voltage command calculation unit that calculates AC voltage command values of n phases which are voltage command values applied to the armature windings of n phases, based on the voltage command values of the first-axis and the second-axis, and the electrical angle; and a switching control unit that controls on/off plural switching devices provided in the inverter, based on the AC voltage command values of n phases.

A second controller for AC rotary electric machine according to the present disclosure that controls an AC rotary electric machine which is provided with armature windings of n phases (n is a natural number greater than or equal to two) via an inverter, the controller for AC rotary electric machine including:

a rotation detection unit that detects or estimates an electrical angle and an electrical angle speed of a rotor of the AC rotary electric machine;

a current command calculation unit that calculates current command values of a first-axis and a second-axis on a two-axis rotating coordinate system consisting of the first-axis and the second-axis which rotate synchronizing with rotation of the electrical angle of the rotor;

a current model response calculation unit that calculates current model response values of the first-axis and the second-axis by performing a response delay processing of a model response to the current command values of the first-axis and the second-axis;

a two-axis voltage command calculation unit that calculates interlinkage fluxes corresponding to model response of the first-axis and the second-axis based on the current model response values of the first-axis and the second-axis, and calculates voltage command values of the first-axis and the second-axis on the two-axis rotating coordinate system which make currents of the first-axis and the second-axis change to the current model response values of the first-axis and the second-axis in a feedforward manner, based on the current model response values of the first-axis and the second-axis, the interlinkage fluxes corresponding to model response of the first-axis and the second-axis, and the electrical angle speed; and an AC voltage command calculation unit that calculates AC voltage command values of n phases which are voltage command values applied to the armature windings of n phases, based on the voltage command values of the first-axis and the second-axis, and the electrical angle; and a switching control unit that controls on/off plural switching devices provided in the inverter, based on the AC voltage command values of n phases.

According to the first controller for AC rotary electric machine of the present disclosure, when calculating the voltage command values which make the interlinkage fluxes change in the feedforward manner with the model response, the linear interlinkage flux model response values of first-axis and second-axis which does not change according to the currents of first-axis and second-axis, but change according to time are used. Accordingly, without performing the partial differential of the interlinkage fluxes of first-axis and second-axis with respect to the currents of first-axis and second-axis, it is possible to perform linear calculation processing. The increase in calculation processing load can be suppressed. And, since the interlinkage fluxes are used directly, the nonlinear characteristics of the interlinkage fluxes of first-axis and second-axis which change according to the currents of first-axis and second-axis can be considered, and control accuracy can be improved.

According to the second controller for AC rotary electric machine of the present disclosure, based on the current model response values of first-axis and second-axis, and the interlinkage fluxes corresponding to model response of first-axis and second-axis calculated based on the current model response values of first-axis and second-axis, the voltage command values of first-axis and second-axis are calculated. Accordingly, it is possible to perform linear calculation processing based on the current model response values of first-axis and second-axis; and the increase in calculation processing load can be suppressed, and calculation accuracy can be improved. Since the current model response values of first-axis and second-axis, and the interlinkage fluxes corresponding to model response of first-axis and second-axis calculated based on the current model response values of first-axis and second-axis is used, the nonlinear characteristics of the interlinkage fluxes of first-axis and second-axis which change according to the currents of first-axis and second-axis can be considered, and control accuracy can be improved.

BRIEF DESCRIPTION OF THE DRAWINGS

FIG. 11 is a block diagram of the two-axis voltage command calculation unit according to Embodiment 2.

DETAILED DESCRIPTION OF THE EMBODIMENTS

1. Embodiment 1

Figure 1:
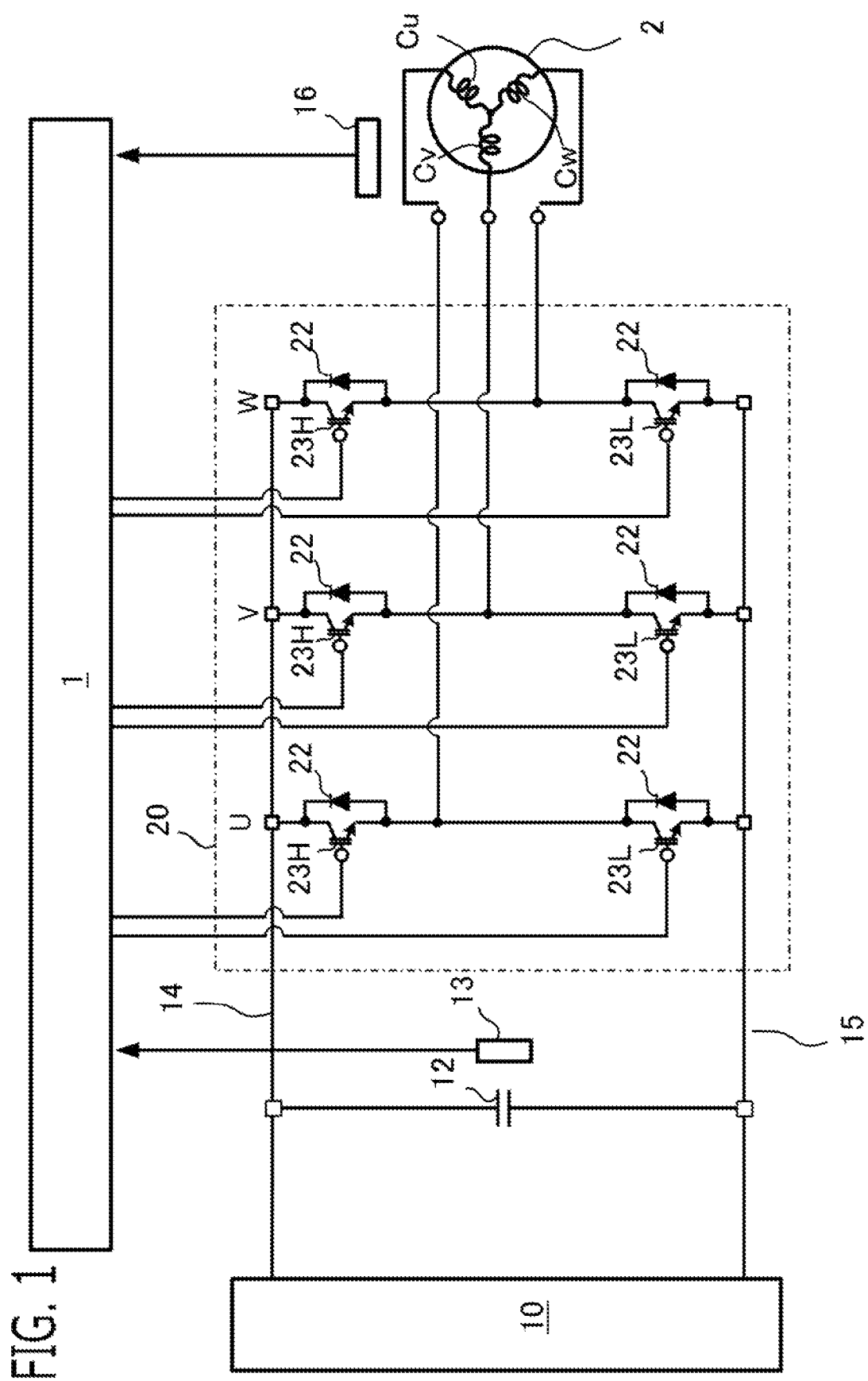
FIG. 1 is a schematic configuration diagram of the AC rotary electric machine and the controller for AC rotary electric machine according to Embodiment 1.

A controller for AC rotary electric machine (hereinafter, referred to simply as the controller 1) according to Embodiment 1 will be explained with reference to drawings. FIG. 1 is a schematic configuration diagram of the AC rotary electric machine 2 and the controller 1 according to the present embodiment.

1-1. AC Rotary Electric Machine

The AC rotary electric machine 2 is provided with armature windings (hereinafter, referred to simply as windings) of n phases (n is a natural number of greater than or equal to two). The AC rotary electric machine 2 is provided a stator and a rotor. In the present embodiment, it is set to n=3, and it is set to three phases of U phase, V phase, and W phase. The stator is provided with three-phase windings Cu, Cv, Cw. The three-phase windings Cu, Cv, Cw are connected by star connection. The three-phase windings may be connected by delta connection. The magnet is provided in the rotor, and the AC rotary electric machine 1 is a permanent magnet type synchronous AC rotary electric machine. In the present embodiment, the permanent magnet is embedded inside of the rotor core which consists of the electromagnetic steel plates.

The AC rotary electric machine 2 is provided with a rotation sensor 16 which outputs an electric signal according to a rotational angle of the rotor. The rotation sensor 16 is a Hall element, an encoder, or a resolver. An output signal of the rotation sensor 16 is inputted into the controller 1.

1-2. Inverter

The inverter 20 performs power conversion between the DC power source 10 and the three-phase windings, and has a plurality of switching devices. The inverter 20 is provided with three sets of a series circuit (leg) where a positive electrode side switching device 23H (upper arm) connected to the positive electrode side of the DC power source 10 and a negative electrode side switching device 23L (lower arm) connected to the negative electrode side of the DC power source 10 are connected in series, corresponding to respective phase of the three-phase windings. The inverter 20 is provided with a total of six switching devices of the three positive electrode side switching devices 23H, and the three negative electrode side switching devices 23L. Then, a connection node where the positive electrode side switching device 23H and the negative electrode side switching device 23L are connected in series is connected to the winding of the corresponding phase.

Specifically, in each phase of the series circuit, the collector terminal of the positive electrode side switching device 23H is connected to the positive electrode side wire 14, the emitter terminal of the positive electrode side switching device 23H is connected to the collector terminal of the negative electrode side switching device 23L, and the emitter terminal of the negative electrode side switching device 23L is connected to the negative electrode side electric wire 15. The connection node between the positive pole side switching device 23H and the negative pole side switching device 23L is connected to the winding of the corresponding phase. IGBT (Insulated Gate Bipolar Transistor) in which a diode 22 is connected in inverse parallel, MOSFET (Metal Oxide Semiconductor Field Effect Transistor) which has a function of diode connected in inverse parallel, or the like is used for the switching device. A gate terminal of the each switching device is connected to the controller 1. The each switching device is turned on or turned off by the control signal outputted from the controller 1.

A smoothing capacitor 12 is connected between the positive electrode side wire 14 and the negative electrode side wire 15. A power source voltage sensor 13 which detects a power source voltage supplied to the inverter 20 from the DC power source 10 is provided. The power source voltage sensor 13 is connected between the positive electrode side electric wire 14 and the negative electrode side electric wire 15. An output signal of the power source voltage sensor 13 is inputted to the controller 1.

A chargeable and dischargeable electricity accumulation device (for example, a lithium ion battery, a nickel hydoride battery, an electrical double layer capacitor) is used for the DC power source 10. A DC-DC converter which is a DC electric power converter which steps up or steps down the DC voltage may be provided in the DC power source 10.

1-3. Controller 1

Figure 2:
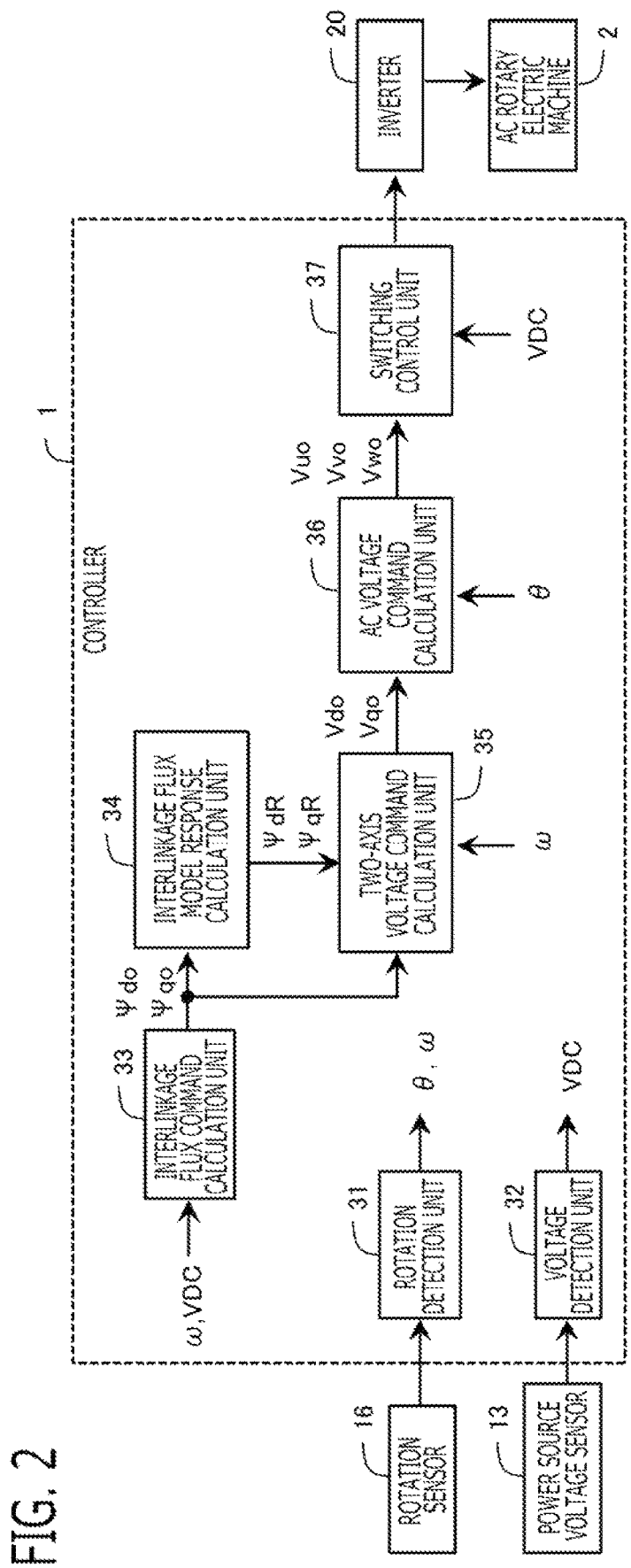
FIG. 2 is a schematic block diagram of the controller for AC rotary electric machine according to Embodiment 1.
Figure 3:
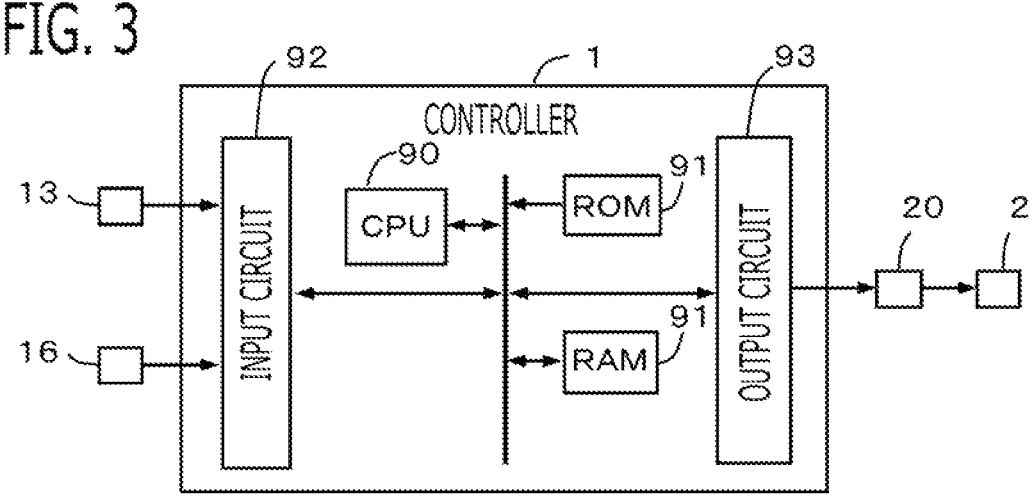
FIG. 3 is a hardware configuration diagram of the controller for AC rotary electric machine according to Embodiment 1.

The controller 1 controls the AC rotary electric machine 2 via the inverter 20. As shown in FIG. 2, the controller 1 is provided with a rotation detection unit 31, a voltage detection unit 32, an interlinkage flux command calculation unit 33, an interlinkage flux model response calculation unit 34, a two-axis voltage command calculation unit 35, an AC voltage command calculation unit 36, a switching control unit 37, and the like. Each function of the controller 1 is realized by processing circuits provided in the controller 1. Specifically, as shown in FIG. 3, the controller 1 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like. The storage apparatuses 91, the input circuit 92, and the output circuit 93 are connected to the arithmetic processor 90 via signal wires such as a bus.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatus 91, volatile and nonvolatile storage apparatuses, such as RAM (Random Access Memory), ROM (Read Only Memory), and EEPROM (Electrically Erasable Programmable ROM), are provided. The input circuit 92 is connected with various kinds of sensors and switches such as the power source voltage sensor 13 and the rotation sensor 16, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as ROM and EEPROM and collaborates with other hardware devices in the controller 1, such as the storage apparatuses 91, the input circuit 92, and the output circuit 93, so that the respective functions of the control units 31 to 37 of FIG. 2 provided in the controller 1 are realized. Setting data items such as a current-interlinkage flux conversion characteristic data of dq-axis, a winding resistance value R, and a time constant Tr to be utilized in the control units 31 to 37 are stored, as part of software items (programs), in the storage apparatus 91 such as ROM and EEPROM. Each function of the controller 1 will be described in detail below.

1-3-1. Basic Control

The rotation detection unit 31 detects an electrical angle θ (in this example, the magnetic pole position θ) and an electrical angle speed ω of the rotor. In the present embodiment, the rotation detection unit 31 detects the magnetic pole position θ (the electrical angle θ) and the electrical angle speed ω of the rotor, based on the output signal of the rotation sensor 16. In the present embodiment, the magnetic pole position θ is set to a direction of the N pole of the permanent magnet provided in the rotor. The rotation detection unit 31 may estimate the electrical angle θ (the magnetic pole position θ) of the rotor without using the rotation sensor, based on current information which is obtained by superimposing a harmonic wave component on the current command value (so-called, sensorless system).

The voltage detection unit 32 detects a power source voltage VDC supplied to the inverter 20 from the DC power source 10. In the present embodiment, the voltage detection unit 32 detects the power source voltage VDC, based on the output signal of the power source voltage sensor 13.

The interlinkage flux command calculation unit 33 calculates interlinkage flux command values of two-axis on a two-axis rotating coordinate system. The two-axis rotating coordinate system is a coordinate system of two-axis consisting of a first axis and a second axis which rotate synchronizing with rotation of the rotor in the electrical angle.

In the present embodiment, a dq-axis rotating coordinate system is used as the two-axis rotating coordinate system. The dq-axis rotating coordinate system is a rotating coordinate system of two-axis which consist of a d-axis defined in a direction of the N pole of the rotor (in this example, a direction of the magnetic pole position θ) and a q-axis defined in a direction which advanced to the d-axis by 90 degrees in the electrical angle, and it rotates synchronizing with rotation of the N pole of the rotor. The d-axis corresponds to the first axis and the q-axis corresponds to the second axis. If the sensorless method which estimates the electrical angle θ and electrical angle speed ω is used, the rotating coordinate system of γβ-axis which is estimation of the dq-axis may be used as the two-axis rotating coordinate system. In this case, the d-axis is replaced to the γ-axis, the q-axis is replaced to the β-axis, and the processing itself explained in the following does not change.

The interlinkage flux command calculation unit 33 calculates an interlinkage flux command value of d-axis Ψdo and an interlinkage flux command value of q-axis Ψqo on the dq-axis rotating coordinate system. In the present embodiment, the interlinkage flux command calculation unit 33 calculates the interlinkage flux command values of dq-axis Ψdo, Ψqo, using the current vector control method, such as the maximum torque/current control, the magnetic flux weakening control, and the Id=0 control, based on a target torque, the power source voltage VDC, the electrical angle speed ω, and the like. The target torque may be transmitted from an external device, or may be calculated in the controller 1. The interlinkage flux command calculation unit 33 may calculate the interlinkage flux command values of dq-axis Ψdo, Ψqo directly based on the target torque and the like. Alternatively, the interlinkage flux command calculation unit 33 may calculate the current command values of dq-axis Ido, Iqo based on the target torque and the like, and may calculate the interlinkage flux command values of dq-axis Ψdo, Ψqo corresponding to the calculated current command values of dq-axis Ido, Iqo with reference to the current-interlinkage flux conversion characteristic data described below.

The AC voltage command calculation unit 36 calculates voltage command values of three phases Vuo, Vvo, Vwo which are voltage command values applied to the three-phase windings, based on the voltage command values of dq-axis Vdo, Vqo calculated by the two-axis voltage command calculation unit 35 described below, and the electrical angle θ (the magnetic pole position θ). Specifically, the AC voltage command calculation unit 36 converts the voltage command values of dq-axis Vdo, Vqo into the voltage command values of three phases Vuo, Vvo, Vwo, by performing a fixed coordinate conversion and a two-phase/three-phase conversion based on the magnetic pole position θ. The well-known modulation, such as the space vector modulation or the two-phase modulation, may be added to the voltage command values of three phases in order to improve the voltage utilization factor.

The switching control unit 37 controls on/off plural switching devices provided in the inverter 20, based on the voltage command values of three phases Vuo, Vvo, Vwo. For example, the switching control unit 37 compares each of the voltage command values of three phases Vuo, Vvo, Vwo with a carrier wave (a triangular wave) which oscillates with an amplitude of the power source voltage VDC/2 centering on 0 at a carrier frequency; and turns on a rectangular pulse wave when the voltage command value exceeds the carrier wave, and turns off the rectangular pulse wave when the voltage command value is below the carrier wave. Alternatively, the space vector PWM may be used. The switching control unit 37 outputs control signals according to the rectangular pulse waves of three phases to the inverter 20, and turns on and off each switching device of the inverter 20.

1-3-2. Interlinkage Flux Feedforward Control

In the present embodiment, the two-axis voltage command calculation unit 35 performs an interlinkage flux feedforward control which calculates the voltage command values of dq-axis Vdo, Vqo according to the interlinkage flux command values of dq-axis Ψdo, Ψqo.

1-3-2-1. Problem of Current Feedforward Control

<Voltage Equation of Current Base>

In the conventional current feedback control, as shown in the next equation, the feedback control system is designed based on the voltage equation which is linearized with respect to the currents of dq-axis Id, Iq.

$$\begin{pmatrix} V_d \\ V_q \end{pmatrix} = R\begin{pmatrix} I_d \\ I_q \end{pmatrix} + \begin{pmatrix} L_d & 0 \\ 0 & L_q \end{pmatrix}\frac{d}{dt}\begin{pmatrix} I_d \\ I_q \end{pmatrix} + \begin{pmatrix} 0 & -\omega L_q \\ \omega L_d & 0 \end{pmatrix}\begin{pmatrix} I_d \\ I_q \end{pmatrix} + \begin{pmatrix} 0 \\ \omega \Psi_a \end{pmatrix} \quad (1)$$

Herein, Vd is a voltage of d-axis, Vq is a voltage of q-axis, Id is a current of d-axis, Iq is a current of q-axis, ω is the electrical angle speed of the rotor, R is a resistance value of winding, Ld is an inductance of d-axis, Lq is an inductance of q-axis, and Ψa is an interlinkage flux by the permanent magnet.

<Conventional Current Feedforward Controller>

The conventional current feedforward controller which is designed based on the equation (1) and which is described in the equation (5) to the equation (8) of the JP 4161064 B becomes like the next equation.

$$\begin{pmatrix} V_{do} \\ V_{qo} \end{pmatrix} = \begin{pmatrix} R+sL_d & -\omega L_q \\ \omega L_d & R+sL_q \end{pmatrix}\frac{1}{1+T_rs}\begin{pmatrix} I_{do} \\ I_{qo} \end{pmatrix} + \begin{pmatrix} 0 \\ \omega \Psi_a \end{pmatrix} \quad (2)$$

In the conventional equation (2), the current model response values of dq-axis obtained by performing the response delay processing of the model response of the first order lag to the current command values of dq-axis Ido, Iqo are used. s is the Laplacian operator, and Tr is a time constant of the first order lag.

<Problem Due to Interdependency Between Currents of Dq-Axis and Interlinkage Flux>

However, in the rotary electric machine which generates the reluctance torque, the interlinkage flux component which is generated by the rotor core (the electromagnetic steel plates) having nonlinear magnetic saturation characteristics exists. Therefore, the induction electromotive force which is generated by change of interlinkage flux does not become the linear equation in which the inductance of each axis and the current change are multiplied like the second term on the right side of the equation (1) correctly, but the modeling error exists. Specifically, the interlinkage flux of d-axis Ψd changes not only with the current of d-axis Id but also with the current of q-axis Iq, and the interlinkage flux of q-axis Ψq changes not only with the current of q-axis Iq but also with the current of d-axis Id.

Accordingly, in the current feedforward type control method using the d-axis inductance Ld and the q-axis inductance Lq like the equation (2), the interlinkage flux of d-axis Ψd which changes according to the current of d-axis Id, and the interlinkage flux of q-axis Ψq which changes according to the current of q-axis Iq can be considered, but the interlinkage flux of d-axis Ψd which changes according to the current of q-axis Iq, and the interlinkage flux of q-axis Ψq which changes according to the current of d-axis Id cannot be considered. Therefore, there was a problem that control accuracy is deteriorated.

1-3-2-2. Derivation of Interlinkage Flux Feedforward Control System

<Voltage Equation Using Interlinkage Fluxes of Dq-Axis>

Then, a control system which considers the interlinkage fluxes of dq-axis which change mutually according to the currents of dq-axis will be derived. If the voltage equation is directly expressed using the interlinkage flux of d-axis Ψd and the interlinkage flux of q-axis Ψq, it will become like the next equation.

$$\begin{pmatrix} V_d \\ V_q \end{pmatrix} = R\begin{pmatrix} I_d \\ I_q \end{pmatrix} + \frac{d}{dt}\begin{pmatrix} \Psi_d(I_d, I_q) \\ \Psi_q(I_d, I_q) \end{pmatrix} + \begin{pmatrix} 0 & -\omega \\ \omega & 0 \end{pmatrix}\begin{pmatrix} \Psi_d(I_d, I_q) \\ \Psi_q(I_d, I_q) \end{pmatrix} \quad (3)$$

Herein, as mentioned above, in the rotary electric machine which generates the reluctance torque, the interlinkage flux of d-axis Ψd changes according to the current of d-axis Id and the current of q-axis Iq. Accordingly, the interlinkage flux of d-axis Ψd becomes a function of the current of d-axis Id and the current of q-axis Iq (Ψd (Id, Iq)). Similarly, the interlinkage flux of q-axis Ψq changes according to the current of d-axis Id and the current of q-axis Iq. Accordingly, the interlinkage flux of q-axis Ψq becomes a function of the current of d-axis Id and the current of q-axis Iq (Ψq (Id, Iq)). The interlinkage flux Ψa by the permanent magnet of the equation (1) is included in the interlinkage flux of d-axis Ψd. Since the voltage drop due to the winding resistance value R of the right side first term of the equation (3) cannot be expressed with the interlinkage flux, the currents of dq-axis Id, Iq are used similar to the equation (1). Accordingly, the current and the interlinkage flux are mixed on the right side of the equation (3).

Based on the equation (3), an interlinkage flux feedforward controller which calculates the voltage command values of dq-axis which make the interlinkage fluxes of dq-axis change in a feedforward manner with a model response will be designed.

<Feedforward Controller According to a Comparative Example>

In a comparative example, as shown in the equation (4) and the equation (5), similar to the conventional method, current model response values of dq-axis IdR, IqR obtained by performing the response delay processing of the model response (in this example, the first order lag) to the current command values of dq-axis Ido, Iqo are used as the currents of dq-axis Id, Iq of the equation (3), and the voltage command values of dq-axis Vdo, Vqo are calculated by feedforward control.

$$\begin{pmatrix} I_{dR} \\ I_{qR} \end{pmatrix} = \frac{1}{1+T_r s} \begin{pmatrix} I_{do} \\ I_{qo} \end{pmatrix} \quad (4)$$

$$\begin{pmatrix} V_{do} \\ V_{qo} \end{pmatrix} = R \begin{pmatrix} I_{dR} \\ I_{qR} \end{pmatrix} + \frac{d}{dt} \begin{pmatrix} \Psi_d(I_{dR}, I_{qR}) \\ \Psi_q(I_{dR}, I_{qR}) \end{pmatrix} + \begin{pmatrix} 0 & -\omega \\ \omega & 0 \end{pmatrix} \begin{pmatrix} \Psi_d(I_{dR}, I_{qR}) \\ \Psi_q(I_{dR}, I_{qR}) \end{pmatrix} \quad (5)$$

In this case, between the exact differential d/dt of the right side second term of the equation (5) and the current command values of dq-axis Ido, Iqo of the equation (4), functions of interlinkage fluxes of dq-axis $\Psi$d, $\Psi$q which are nonlinear functions of the currents of dq-axis Id, Iq are interposed. Accordingly, the calculation order between the differential operation and the calculation of interlinkage fluxes of dq-axis based on the currents of dq-axis cannot be exchanged. In order to perform the exact differential of the interlinkage fluxes of dq-axis $\Psi$d, $\Psi$q which change according to the currents of dq-axis, it is necessary to perform a linear approximation calculation which performs the partial differentials of the interlinkage fluxes of dq-axis $\Psi$d, $\Psi$q with respect to the current of d-axis, performs the partial differentials of the interlinkage fluxes of dq-axis $\Psi$d, $\Psi$q with respect to the current of q-axis, and totals both partial differential values. Accordingly, calculation becomes complicated. And, even if the model response of the currents of dq-axis is the first order lag, the model response of the interlinkage fluxes of dq-axis does not necessarily become the first order lag. Accordingly, the interlinkage fluxes cannot be changed with good accuracy with the model response.

<Design of Feedforward Controller According to Present Embodiment>

Then, in the present embodiment, as shown in the equation (6) and the equation (7), interlinkage flux model response values of dq-axis $\Psi$dR, $\Psi$qR obtained by performing the response delay processing of the model response (in this example, the first order lag) to the interlinkage flux command values of dq-axis $\Psi$do, $\Psi$qo are used as the interlinkage fluxes of dq-axis $\Psi$d, $\Psi$q of the equation (3), the voltage command values of dq-axis Vdo, Vqo are calculated by feedforward control.

$$\begin{pmatrix} \Psi_{dR} \\ \Psi_{qR} \end{pmatrix} = \frac{1}{1+T_r s} \begin{pmatrix} \Psi_{do} \\ \Psi_{qo} \end{pmatrix} \quad (6)$$

$$\begin{pmatrix} V_{do} \\ V_{qo} \end{pmatrix} = R \begin{pmatrix} I_{dcR} \\ I_{qcR} \end{pmatrix} + \frac{d}{dt} \begin{pmatrix} \Psi_{dR} \\ \Psi_{qR} \end{pmatrix} + \begin{pmatrix} 0 & -\omega \\ \omega & 0 \end{pmatrix} \begin{pmatrix} \Psi_{dR} \\ \Psi_{qR} \end{pmatrix} \quad (7)$$

In this case, the interlinkage flux model response values of dq-axis $\Psi$dR, $\Psi$qR to which the exact differentials are performed do not change according to the currents of dq-axis Id, Iq, but change according to time t. Accordingly, calculation is possible by performing time differential, without performing partial differential with respect to the currents of dq-axis. As shown in the next equation obtained by replacing the time differential d/dt of the right side second term of the equation (7) by Laplacian operator s, and substituting the equation (6) for the equation (7), the differential operation and the response delay processing of the model response (in this example, the first order lag) can be calculated collectively, and the calculation of time differential can be avoided. And, if equivalent conversion of the transfer function is performed as shown in the second line of the equation (8) and calculation is contrived, efficient calculation can be performed.

$$s\begin{pmatrix} \Psi_{dR} \\ \Psi_{qR} \end{pmatrix} = \frac{s}{1+T_r s}\begin{pmatrix} \Psi_{do} \\ \Psi_{qo} \end{pmatrix} = \frac{1}{T_r}\left(\frac{1+T_r s}{1+T_r s} - \frac{1}{1+T_r s}\right)\begin{pmatrix} \Psi_{do} \\ \Psi_{qo} \end{pmatrix} = \frac{1}{T_r}\left(\begin{pmatrix} \Psi_{do} \\ \Psi_{qo} \end{pmatrix} - \begin{pmatrix} \Psi_{dR} \\ \Psi_{qR} \end{pmatrix}\right) \quad (8)$$

If the response delay processing of the model response is performed to the interlinkage fluxes, as shown in the right side first term of the equation (7), it is necessary to use, as the currents of dq-axis, current values of dq-axis IdcR, IqcR (hereinafter, referred to as current values corresponding to model response of dq-axis IdcR, IqcR) corresponding to the interlinkage flux model response values of dq-axis $\Psi$dR, $\Psi$qR. As described in detail later, by utilizing the fact that the next equation is established between the interlinkage flux model response values of dq-axis $\Psi$dR, $\Psi$qR and the current values corresponding to model response of dq-axis IdcR, IqcR, the current values corresponding to model response of dq-axis IdcR, IqcR can be calculated.

$$\begin{pmatrix} \Psi_{dR} \\ \Psi_{qR} \end{pmatrix} = \begin{pmatrix} \Psi_d(I_{dcR}, I_{qcR}) \\ \Psi_q(I_{dcR}, I_{qcR}) \end{pmatrix} \quad (9)$$

<Configuration of Feedforward Controller>

Then, the interlinkage flux model response calculation unit 34 calculates the interlinkage flux model response values of dq-axis $\Psi$dR, $\Psi$qR, by performing the response delay processing of the model response to the interlinkage flux command values of dq-axis $\Psi$do, $\Psi$qo. In the present embodiment, as shown in the equations (6), the interlinkage flux model response calculation unit 34 uses the filter processing of the first order lag as the response delay processing of the model response. As the response delay processing of the model response, various kinds of filter processing, such as the filter processing of the second order lag, may be used. Although each equation is expressed using Laplacian operator s, it is discretized by well-known method and implemented in the controller 1.

Then, the two-axis voltage command calculation unit 35 calculates the voltage command values of dq-axis Vdo, Vqo which make the interlinkage fluxes of dq-axis $\Psi$d, $\Psi$q change to the interlinkage flux model response values of dq-axis $\Psi$dR, $\Psi$qR in a feedforward manner, based on the interlinkage flux model response values of dq-axis $\Psi$dR, $\Psi$qR, and the electrical angle speed $\omega$.

According to this configuration, when calculating the voltage command values which make the interlinkage fluxes change in the feedforward manner with the model response, the linear interlinkage flux model response values of dq-axis ΨdR, ΨqR which does not change according to the currents of dq-axis, but change according to time are used. Accordingly, without performing the partial differential of the interlinkage fluxes of dq-axis with respect to the currents of dq-axis, it is possible to perform the linear calculation processing, such as the time differential, or the calculation which combined the time differential and the response delay processing of the model response, and the increase in calculation processing load can be suppressed. And, since the interlinkage fluxes are used directly, the nonlinear characteristics of the interlinkage fluxes of dq-axis Ψd, Ψq which changes according to the currents of dq-axis Id, Iq is not affected, and control accuracy can be improved.

Figure 4:
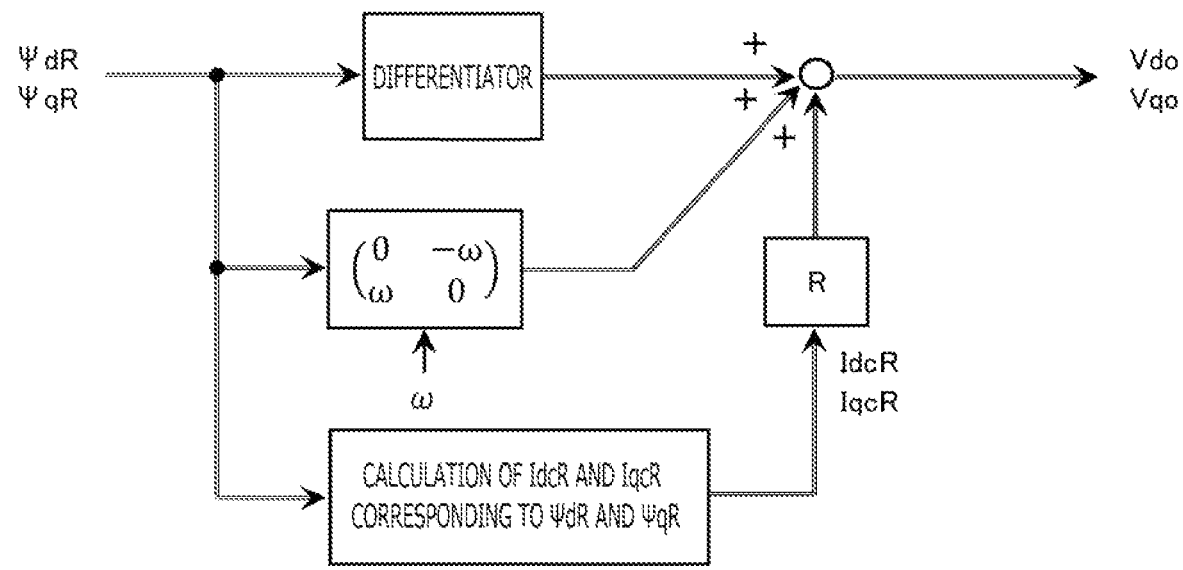
FIG. 4 is a block diagram of the two-axis voltage command calculation unit according to Embodiment 1.

Specifically, as shown in the equation (7), the two-axis voltage command calculation unit 35 calculates the voltage command value of d-axis Vdo, by totaling a time differential value of the interlinkage flux model response value of d-axis ΨdR, a value obtained by multiplying the electrical angle speed ω and −1 to the interlinkage flux model response value of q-axis ΨqR, and a value obtained by multiplying the winding resistance value R to the current value corresponding to model response of d-axis IdcR which is a current value of d-axis corresponding to the interlinkage flux model response values of dq-axis ΨdR, ΨqR. And, the two-axis voltage command calculation unit 35 calculates the voltage command value of q-axis Vqo, by totaling a time differential value of the interlinkage flux model response value of q-axis ΨqR, a value obtained by multiplying the electrical angle speed ω to the interlinkage flux model response value of d-axis ΨdR, and a value obtained by multiplying the winding resistance value R to the current value corresponding to model response of q-axis IqcR which is a current value of q-axis corresponding to the interlinkage flux model response values of dq-axis ΨdR, ΨqR. The block diagram of this case becomes as shown in FIG. 4.

The detail of calculation processing of the current values corresponding to model response of dq-axis IdcR, IqcR corresponding to the interlinkage flux model response values of dq-axis ΨdR, ΨqR will be described below. If the winding resistance value R is small, and the term of the winding resistance value R of the right side first term of the equation (7) is sufficient small compared with other terms, this calculation processing of the term of the winding resistance value R may not be performed. In this case, since iterative calculation described below is not performed, calculation processing load can be reduced.

Figure 5:
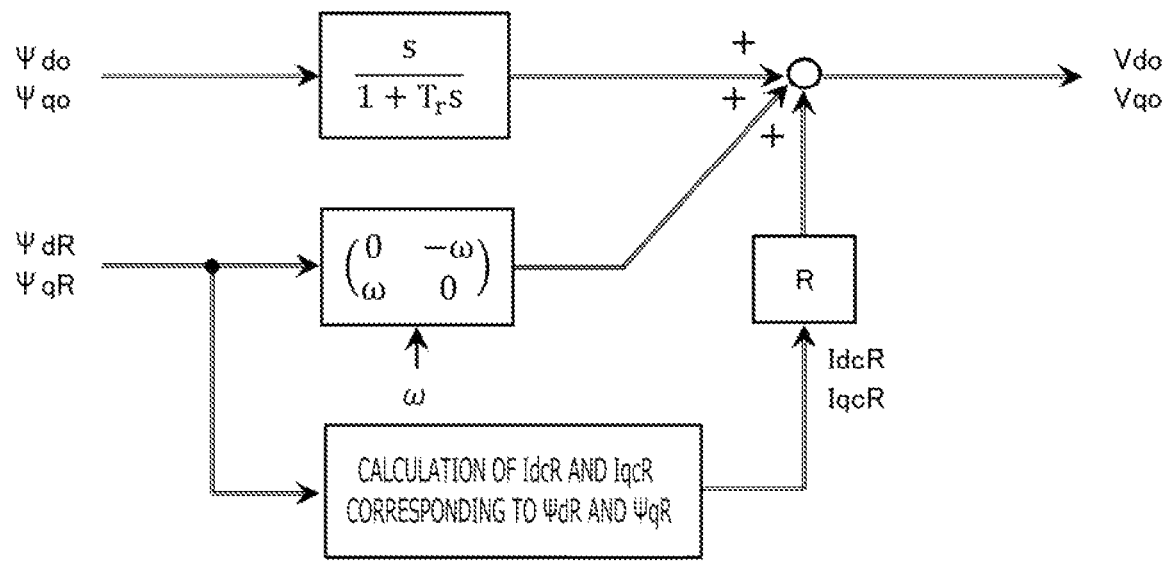
FIG. 5 is a block diagram of the two-axis voltage command calculation unit according to Embodiment 1.

Alternatively, as shown in the first line of the equation (8), the two-axis voltage command calculation unit 35 may calculate the time differential values of the interlinkage flux model response values of dq-axis ΨdR, ΨqR, by performing a calculation which combined the time differential and the response delay processing of the model response to the interlinkage flux command values of dq-axis Ψdo, Ψqo. In this case, the combined whole transfer function may be discretized, or the equivalent conversion may be performed like the example of the second line of the equation (8). The block diagram of this case becomes as shown in FIG. 5.

According to this configuration, the time differential is not independently performed at the last, and by the combined calculation, calculation value is not excessively varied by the noise component and the variation component.

Figure 6:
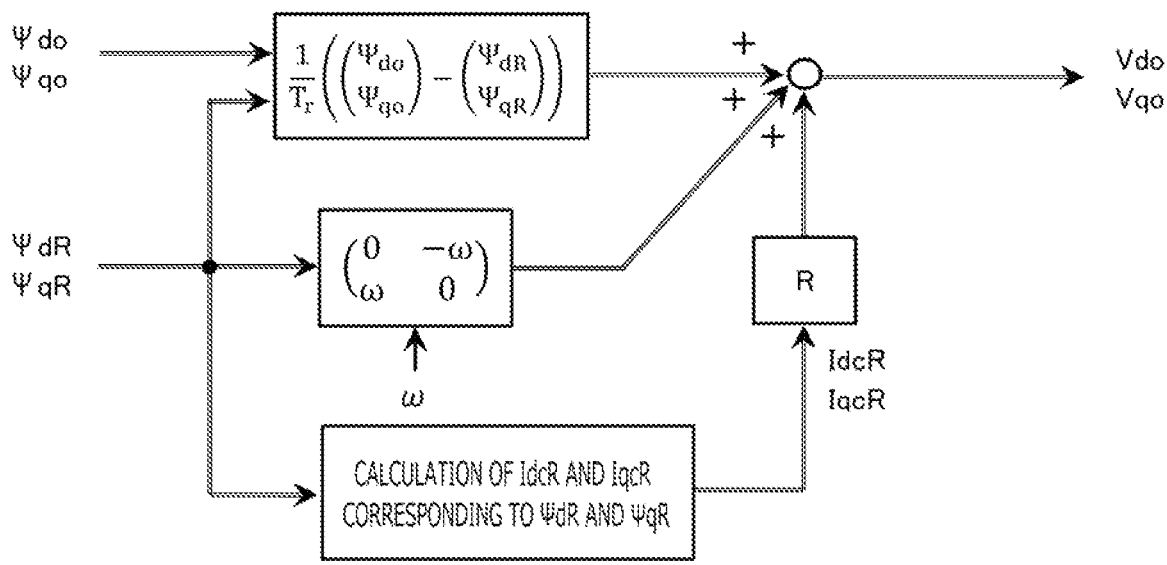
FIG. 6 is a block diagram of the two-axis voltage command calculation unit according to Embodiment 1.

Alternatively, if the response delay processing of the model response is the filter processing of the first order lag, as shown in the second line of the equation (8), the two-axis voltage command calculation unit 35 may calculate the time differential value of the interlinkage flux model response value of d-axis ΨdR, by dividing a value obtained by subtracting the interlinkage flux model response value of d-axis ΨdR from the interlinkage flux command value of d-axis Ψdo, by the time constant Tr of the response delay processing of the model response; and may calculate the time differential value of the interlinkage flux model response value of q-axis ΨqR, by dividing a value obtained by subtracting the interlinkage flux model response value of q-axis ΨqR from the interlinkage flux command value of q-axis Ψqo, by the time constant Tr of the response delay processing of the model response. The block diagram of this case becomes as shown in FIG. 6.

According to this configuration, by simple processing which subtracts the interlinkage flux model response values of dq-axis from the interlinkage flux command values of dq-axis, the time differential values of the interlinkage flux model response values of dq-axis can be calculated. Calculation processing load can be reduced, and calculation value can be prevented from varying excessively by the noise component and the variation component.

<Calculation of Current Values Corresponding to Model Response of Dq-Axis IdcR, IqcR>

The two-axis voltage command calculation unit 35 calculates the current values corresponding to model response of dq-axis IdcR, IqcR, based on the interlinkage flux model response values of dq-axis ΨdR, ΨqR.

As mentioned above, by utilizing the fact that the equation (9) is established between the interlinkage flux model response values of dq-axis ΨdR, ΨqR and the current values corresponding to model response of dq-axis IdcR, IqcR, the current values corresponding to model response of dq-axis IdcR, IqcR can be calculated.

Then, using a current-interlinkage flux conversion characteristic data of d-axis Ψd (Id, Iq) whose input values are set to the current values of dq-axis Id, Iq and whose output value is set to the interlinkage flux of d-axis Ψd, and a current-interlinkage flux conversion characteristic data of q-axis Ψq (Id, Iq) whose input values are set to the current values of dq-axis Id, Iq and whose output value is set to the interlinkage flux of q-axis Ψq, the two-axis voltage command calculation unit 35 searches the current values corresponding to model response of dq-axis IdcR, IqcR corresponding to the interlinkage flux model response values of dq-axis ΨdR, ΨqR by iterative calculation.

According to this configuration, since the nonlinear characteristics of the interlinkage fluxes of dq-axis Ψd, Ψq which changes according to the currents of dq-axis Id, Iq is considered, the calculation accuracy of the current values corresponding to model response of dq-axis IdcR, IqcR is improved, and control accuracy can be improved. Since any characteristic data other than current-interlinkage flux conversion characteristic data of dq-axis is not used, the storage capacity of the storage apparatus 91 can be prevented from increasing.

As the iterative calculation, various kinds of methods represented by Newton's method can be used. However, if the method using slope information like Newton's method is used in order to converge to the optimal value, characteristic data or calculation of slope information of the interlinkage fluxes of dq-axis with respect to the current values of dq-axis is required, and calculation processing becomes complicated. Accordingly, methods of iterative calculation which does not use the slope information of the interlinkage fluxes with respect to the current values, such as Nelder-Mead method, may be used.

As the current-interlinkage flux conversion characteristic data of d-axis and q-axis, a map data or a high order function (for example, a polynomial, a neural network) is used, and it is previously stored in the storage apparatus 91, such as ROM and EEPROM.

Figure 7:
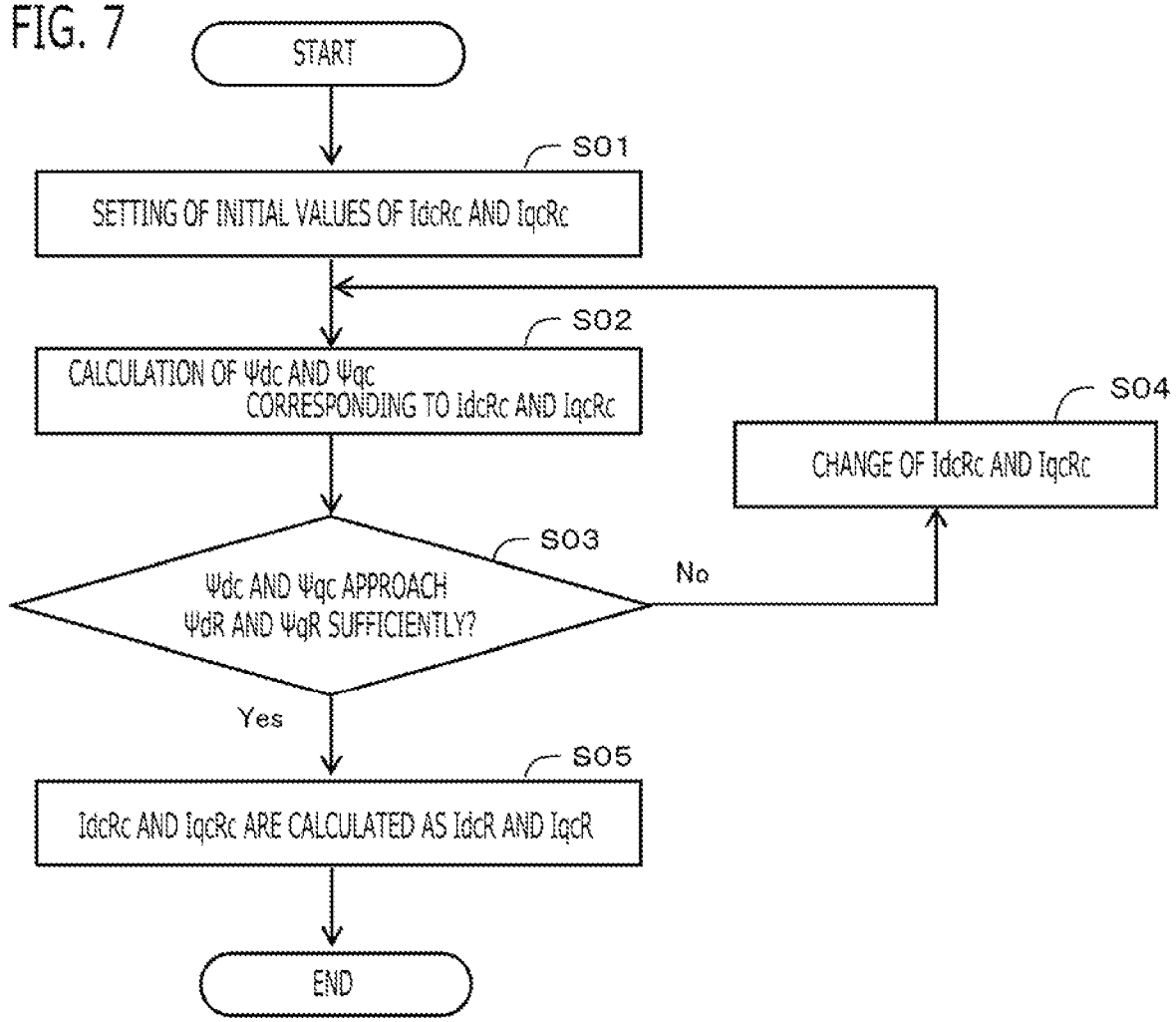
FIG. 7 is a flowchart explaining the iterative calculation of the current values corresponding to model response of dq-axis according to Embodiment 1.

Specifically, as shown in the flowchart of FIG. 7, in the step S01, the two-axis voltage command calculation unit 35 sets the initial values of candidate values of current values corresponding to model response of dq-axis IdcRc, IqcRc of this time. The current values corresponding to model response of dq-axis IdcR, IqcR change continuously with a response delay equivalent to the response delay of the model response. Accordingly, as the initial values of the candidate values of current values corresponding to model response of dq-axis IdcRc, IqcRc of this time search, the current values corresponding to model response of dq-axis IdcR, IqcR which were searched last time may be set. The number of iterations can be reduced, and calculation load can be reduced. Since the current values corresponding to model response of dq-axis IdcR, IqcR change with the response delay of the model response, and the difference between the last time searched values and this time searched values does not become large, the number of iterations can be reduced.

Then, in the step S02, referring to the current-interlinkage flux conversion characteristic data of d-axis and q-axis, the two-axis voltage command calculation unit 35 calculates the candidate value of interlinkage flux of d-axis Ψdc and the candidate value of interlinkage flux of q-axis Ψqc corresponding to the present candidate values of current values corresponding to model response of dq-axis IdcRc, IqcRc.

Then, in the step S03, when the candidate values of interlinkage fluxes of d-axis and q-axis Ψdc, Ψqc calculated in step S02 approach sufficiently the interlinkage flux model response values of dq-axis ΨdR, ΨqR (for example, when the residual norm Nrm becomes less than or equal to a determination value), or when the number of iterations reaches an upper limit number, the two-axis voltage command calculation unit 35 advances to the step S05 and ends the iterative calculation; and otherwise, it advances to the step S04 and continues the iterative calculation. As shown in the next equation, the residual norm Nrm is a total value of a square value of a deviation between the candidate value of interlinkage flux of d-axis Ψdc and the interlinkage flux model response value of d-axis ΨdR, and a square value of a deviation between the candidate value of interlinkage flux of q-axis Ψqc and the interlinkage flux model response value of q-axis ΨqR.

$$Nrm = (\Psi_{dc} - \Psi dR)^2 + (\Psi_{qc} - \Psi_{qR})^2 \quad (10)$$

In the step S04, the two-axis voltage command calculation unit 35 changes the candidate values of current values corresponding to model response of dq-axis IdcRc, IqcRc, based on the candidate value of interlinkage flux of d-axis Ψdc and the candidate value of interlinkage flux of q-axis Ψqc calculated in the step S02, after that, it returns to the step S02. As the change method of candidate values, various kinds of methods, such as Newton's method and Nelder-Mead method, are used. Since each method is well-known, explanation is omitted.

On the other hand, in the step S05, the two-axis voltage command calculation unit 35 calculates the present candidate values of current values corresponding to model response of dq-axis IdcRc, IqcRc as the final current values corresponding to model response of dq-axis IdcR, IqcR, and ends processing.

Alternatively, referring to an interlinkage flux-current conversion characteristic data of d-axis Id (Ψd, Ψq) whose input values are set to the interlinkage fluxes of dq-axis Ψd, Ψq and whose output value is set to the current value of d-axis Id, and an interlinkage flux-current conversion characteristic data of q-axis Iq(Ψd, Ψq) whose input values are set to the interlinkage fluxes of dq-axis Ψd, Ψq and whose input value is set to the current value of q-axis Iq, the two-axis voltage command calculation unit 35 may calculate the current values corresponding to model response of dq-axis IdcR, IqcR corresponding to the interlinkage flux model response values of dq-axis ΨdR, ΨqR.

According to this configuration, since the nonlinear characteristics of the interlinkage fluxes of dq-axis Ψd, Ψq which changes according to the currents of dq-axis Id, Iq is considered, the calculation accuracy of the current values corresponding to model response of dq-axis IdcR, IqcR is improved, and control accuracy can be improved. Although it is necessary to preliminarily set the interlinkage flux-current conversion characteristic data of dq-axis which become the inverse characteristic of the current-interlinkage flux conversion characteristic data of dq-axis, and store in the storage apparatus 91, iterative calculation is unnecessary, and calculation processing load can be reduced significantly.

As the interlinkage flux-current conversion characteristic data of d-axis and q-axis, a map data or a high order function (for example, a polynomial, a neural network) is used, and it is previously stored in the storage apparatus 91, such as ROM and EEPROM.

<Summary, Example of Conversion>

As described above, based on the interlinkage flux model response values of dq-axis ΨdR, ΨqR, the voltage command values of dq-axis Vdo, Vqo which make the interlinkage fluxes of dq-axis Ψd, Ψq change in the feedforward manner are calculated. Therefore, if there is no disturbance and no modeling error, the interlinkage fluxes of dq-axis and the current values of dq-axis can be changed with the model response. The torque which is generated according to the interlinkage fluxes of dq-axis and the current values of dq-axis also becomes the desirable response close to the model response.

In this feedforward controller, since the current sensor is not required, the cost for the current sensor can be suppressed. Since the detected current value of the current sensor is not used for control, there is no influence of delay, noise, and the like which occur in the detected current value.

The current sensor which detects currents flowing through three-phase windings may be provided, and the feedback control based on the current detection values may be performed. In this case, values obtained by adding the voltage command values of dq-axis Vdofb, Vqofb by the feedback control to the voltage command values of dq-axis Vdo, Vqo by the feedforward control mentioned above are calculated as the final voltage command values of dq-axis Vdo, Vqo. As the feedback control, the controller 1 converts the current detection values of three phases Iur, Ivr, Iwr into the current detection value of dq-axis Idr, Iqr, by performing a three-phase/two-phase conversion and a rotating coordinate conversion based on the magnetic pole position θ; and changes the feedback voltage command values of dq-axis Vdofb, Vqofb so that the current detection values of dq-axis Idr, Iqr approach the current values corresponding to model response of dq-axis IdcR, IqcR. Alternatively, similar to JP 6687228 B, the controller 1 calculates interlinkage flux detection values of dq-axis Ψdr, Ψqr, based on the current detection values of dq-axis Idr, Iqr, using the current-interlinkage flux conversion characteristic data of dq-axis; and changes the feedback voltage command values of dq-axis Vdofb, Vqofb so that the interlinkage flux detection values of dq-axis Ψdr, Ψqr approach the interlinkage flux model response values of dq-axis ΨdR, ΨqR. By performing feedback together, robustness can be improved to disturbance and the modeling error. Other components, such as a harmonic wave component, may be added to the voltage command values of dq-axis Vdo, Vqo.

2. Embodiment 2

Next, the controller 1 according to Embodiment 2 will be explained. The explanation for constituent parts the same as those in Embodiment 1 will be omitted. The basic configuration and processing of the AC rotary electric machine 2 and the controller 1 according to the present embodiment is the same as that of Embodiment 1. In Embodiment 1, the interlinkage flux feedforward controller which calculates the voltage command values of dq-axis Vdo, Vqo which make the interlinkage fluxes of dq-axis Ψd, Ψq change in the feedforward manner with the model response was designed. However, in the present embodiment, a current feedforward controller which calculates the voltage command values of dq-axis Vdo, Vqo which make the current values of dq-axis Id, Iq change in a feedforward manner with the model response and which was explained as the comparative example in Embodiment 1 will be designed.

Figure 8:
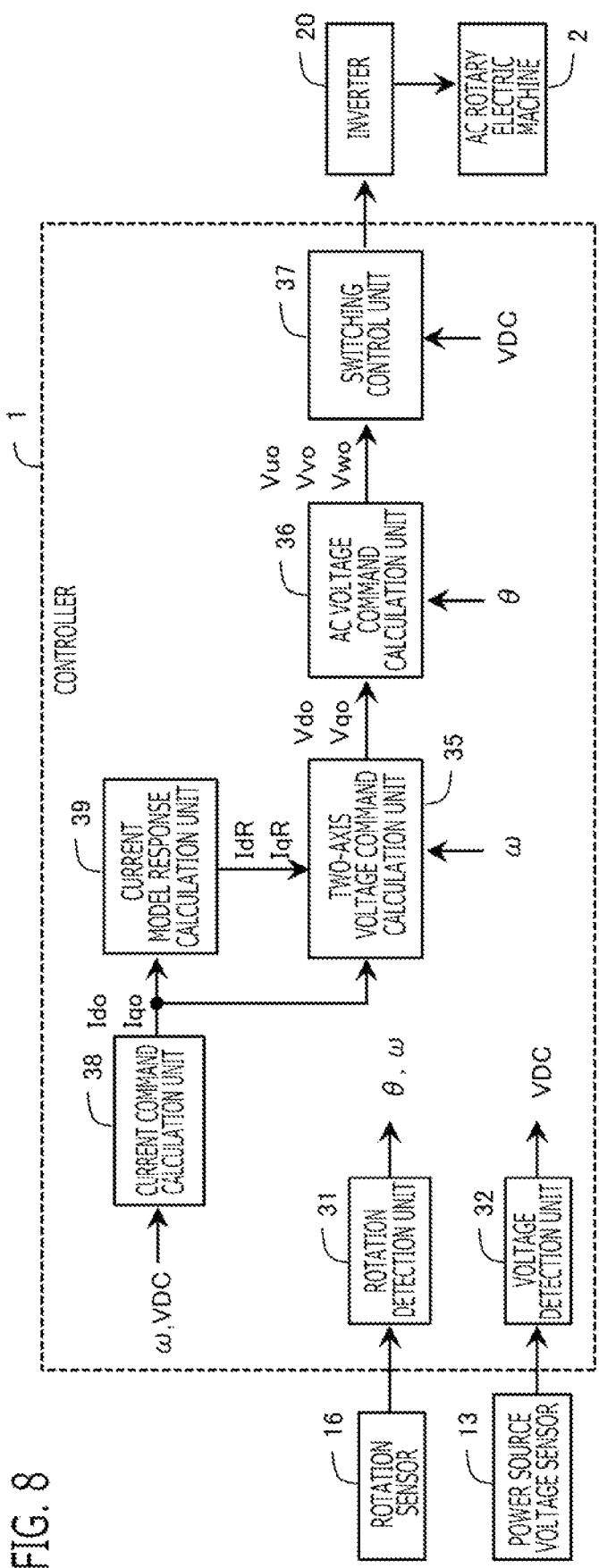
FIG. 8 is a schematic block diagram of the controller for AC rotary electric machine according to Embodiment 2.

In the present embodiment, as shown in the block diagram of FIG. 8, the interlinkage flux command calculation unit 33 of Embodiment 1 is changed into the current command calculation unit 38, the interlinkage flux model response calculation unit 34 is changed into the current model response calculation unit 39, and the configuration of the two-axis voltage command calculation unit 35 is different from Embodiment 1.

<Current Command Calculation Unit 38>

The current command calculation unit 38 calculates the current command value of d-axis Ido and the current command value of q-axis Iqo on the dq-axis rotating coordinate system. In the present embodiment, the current command calculation unit 38 calculates the current command values of dq-axis Ido, Iqo using the current vector control method, such as the maximum torque/current control, the magnetic flux weakening control, and the Id=0 control, based on the target torque, the power source voltage VDC, the electrical angle speed ω, and the like. The target torque may be transmitted from an external device, or may be calculated in the controller 1.

<Current Model Response Calculation Unit 39>

The current model response calculation unit 39 calculates the current model response values of dq-axis IdR, IqR by performing the response delay processing of the model response to the current command values of dq-axis Ido, Iqo. In the present embodiment, as shown in the same next equation as the equation (4), the current model response calculation unit 39 uses the filter processing of the first order lag as the response delay processing of the model response. As the response delay processing of the model response, various kinds of filter processing, such as the filter processing of the second order lag, may be used.

$$\begin{pmatrix} I_{dR} \\ I_{qR} \end{pmatrix} = \frac{1}{1+T_r s} \begin{pmatrix} I_{do} \\ I_{qo} \end{pmatrix} \qquad (11)$$

<Design of Feedforward Controller According to Present Embodiment>

Since the interlinkage fluxes of dq-axis Ψd, Ψq of the right side second term of the equation (5) are nonlinear functions regarding the currents of dq-axis Id, Iq, the time differential cannot be performed as it is. Accordingly, as shown in the next equation, it is necessary to perform a linear approximation calculation which performs the partial differential of each of the interlinkage fluxes Ψd, Ψq of the right side second term of the equation (5) with respect to the current model response value of d-axis IdR and the current model response value of q-axis IqR, and total them.

$$\frac{d}{dt}\begin{pmatrix} \Psi_d(I_{dR}, I_{qR}) \\ \Psi_q(I_{dR}, I_{qR}) \end{pmatrix} = \qquad (12)$$

$$\begin{pmatrix} \frac{\partial \Psi_d}{\partial I_{dR}}\frac{dI_{dR}}{dt} + \frac{\partial \Psi_d}{\partial I_{qR}}\frac{dI_{qR}}{dt} \\ \frac{\partial \Psi_q}{\partial I_{dR}}\frac{dI_{dR}}{dt} + \frac{\partial \Psi_q}{\partial I_{qR}}\frac{dI_{qR}}{dt} \end{pmatrix} = \begin{pmatrix} \frac{\partial \Psi_d}{\partial I_{dR}} & \frac{\partial \Psi_d}{\partial I_{qR}} \\ \frac{\partial \Psi_q}{\partial I_{dR}} & \frac{\partial \Psi_q}{\partial I_{qR}} \end{pmatrix}\begin{pmatrix} \frac{dI_{dR}}{dt} \\ \frac{dI_{qR}}{dt} \end{pmatrix}$$

The partial differentials of the equation (12) are defined as the next equation.

$$\begin{pmatrix} \frac{\partial \Psi_d}{\partial I_{dR}} & \frac{\partial \Psi_d}{\partial I_{qR}} \\ \frac{\partial \Psi_q}{\partial I_{dR}} & \frac{\partial \Psi_q}{\partial I_{qR}} \end{pmatrix} \equiv \begin{pmatrix} L_{dd}(I_{dR}, I_{qR}) & L_{dq}(I_{dR}, I_{qR}) \\ L_{qd}(I_{dR}, I_{qR}) & L_{qq}(I_{dR}, I_{qR}) \end{pmatrix} \qquad (13)$$

Each term of the right side of the equation (13) is called a differential inductance. Similar to the interlinkage fluxes of dq-axis Ψd, Ψq, the differential inductance is also a function of the current of d-axis Id and the current of q-axis Iq. By substituting the equation (12) and the equation (13) for the equation (5), the voltage equation of the next equation using the four differential inductances Ldd, Ldq, Lqd, Lqq is obtained. Accordingly, although it is necessary to prepare characteristic data of the four differential inductances, the increase in computation load can be suppressed. The currents of dq-axis can be changed with good accuracy with the model response.

$$\begin{pmatrix} V_{do} \\ V_{qo} \end{pmatrix} = R\begin{pmatrix} I_{dR} \\ I_{qR} \end{pmatrix} + \begin{pmatrix} L_{dd}(I_{dR}, I_{qR}) & L_{dq}(I_{dR}, I_{qR}) \\ L_{qd}(I_{dR}, I_{qR}) & L_{qq}(I_{dR}, I_{qR}) \end{pmatrix}\frac{d}{dt}\begin{pmatrix} I_{dR} \\ I_{qR} \end{pmatrix} + \qquad (14)$$

$$\begin{pmatrix} 0 & -\omega \\ \omega & 0 \end{pmatrix}\begin{pmatrix} \Psi_d(I_{dR}, I_{qR}) \\ \Psi_q(I_{dR}, I_{qR}) \end{pmatrix}$$

In this case, since the current model response values of dq-axis IdR, IqR change according to time, time differential of these can be performed. As shown in the next equation obtained by replacing the time differential d/dt of the right side second term of the equation (14) by Laplacian operator s, and substituting the equation (11) for the equation (14), the differential operation and the response delay processing of the model response (in this example, the first order lag) can be calculated collectively, and the calculation of time differential can be avoided. And, if equivalent conversion of the transfer function is performed as shown in the second line of the equation (15) and calculation is contrived, efficient calculation can be performed.

$$s\begin{pmatrix} I_{dR} \\ I_{qR} \end{pmatrix} = \frac{s}{1+T_r s}\begin{pmatrix} I_{do} \\ I_{qo} \end{pmatrix} \qquad (15)$$

-continued $$= \frac{1}{T_r}\left(\frac{1+T_r s}{1+T_r s} - \frac{1}{1+T_r s}\right)\binom{I_{do}}{I_{qo}}$$

$$= \frac{1}{T_r}\left(\binom{I_{do}}{I_{qo}} - \binom{I_{dR}}{I_{qR}}\right)$$

<Configuration of Feedforward Controller>

Then, in the present embodiment, corresponding to the right side third term of the equation (14), the two-axis voltage command calculation unit 35 calculates the interlinkage fluxes corresponding to model response of dq-axis ΨdcR, ΨqcR, based on the current model response values of dq-axis IdR, IqR.

In the present embodiment, referring to the current-interlinkage flux conversion characteristic data of d-axis Ψd (Id, Iq) whose input values are set to the current values of dq-axis Id, Iq and whose output value is set to the interlinkage flux of d-axis Ψd, and the current-interlinkage flux conversion characteristic data of q-axis Ψq (Id, Iq) whose input values are set to the current values of dq-axis Id, Iq and whose output value is set to the interlinkage flux of q-axis Ψq, the two-axis voltage command calculation unit 35 calculates the interlinkage fluxes corresponding to model response of dq-axis ΨdcR, ΨqcR which are the interlinkage fluxes of dq-axis corresponding to the current model response values of dq-axis IdR, IqR.

$$\binom{\Psi_{dcR}}{\Psi_{qcR}} = \binom{\Psi_d(I_{dR}, I_{qR})}{\Psi_q(I_{dR}, I_{qR})} \quad (16)$$

As mentioned above, as the current-interlinkage flux conversion characteristic data of d-axis and q-axis, a map data or a high order function (for example, a polynomial, a neural network) is used, and is previously stored in the storage apparatus 91, such as ROM and EEPROM.

The two-axis voltage command calculation unit 35 calculates the interlinkage fluxes corresponding to model response of dq-axis ΨdcR, ΨqcR, based on the current model response values of dq-axis IdR, IqR. The two-axis voltage command calculation unit 35 calculates the voltage command values of dq-axis Vdo, Vqo on the dq-axis rotating coordinate system which make the currents of dq-axis Id, Iq change to the current model response values of dq-axis IdR, IqR in a feedforward manner, based on the current model response values of dq-axis IdR, IqR, the interlinkage fluxes corresponding to model response of dq-axis ΨdcR, ΨqcR, and the electrical angle speed ω.

According to this configuration, based on the current model response values of dq-axis IdR, IqR, and the interlinkage fluxes corresponding to model response of dq-axis ΨdcR, ΨqcR calculated based on the current model response values of dq-axis IdR, IqR, the voltage command values of dq-axis Vdo, Vqo is calculated. Accordingly, it is possible to perform linear calculation processing based on the current model response values of dq-axis IdR, IqR; and by performing the time differential, or the calculation which combined the time differential and the response delay processing of the model response, the increase in calculation processing load can be suppressed, and calculation accuracy can be improved. Since the current model response values of dq-axis IdR, IqR are used, the currents of dq-axis can be changed with good accuracy with the model response.

Figure 9:
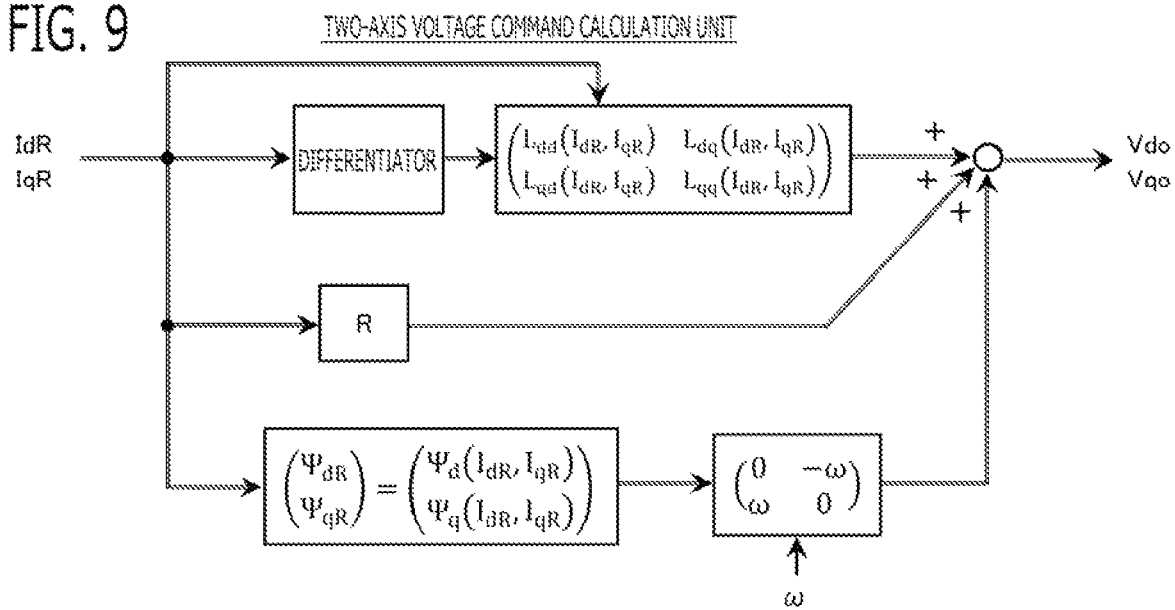
FIG. 9 is a block diagram of the two-axis voltage command calculation unit according to Embodiment 2.

Specifically, as shown in the equation (14), the two-axis voltage command calculation unit 35 calculates the voltage command value of d-axis Vdo, by totaling a value obtained by multiplying a time differential value of the current model response value of d-axis IdR to a d-axis current differential d-axis inductance Ldd obtained by partially differentiating the interlinkage flux of d-axis with respect to the current of d-axis, a value obtained by multiplying a time differential value of the current model response value of q-axis IqR to a q-axis current differential d-axis inductance Ldq obtained by partially differentiating the interlinkage flux of d-axis with respect to the current of q-axis, a value obtained by multiplying the electrical angle speed ω and −1 to the interlinkage flux corresponding to model response of q-axis ΨqcR, and a value obtained by multiplying the winding resistance value R to the current model response value of d-axis IdR. And, the two-axis voltage command calculation unit 35 calculates the voltage command value of q-axis Vqo, by totaling a value obtained by multiplying a time differential value of the current model response value of d-axis IdR to a d-axis current differential q-axis inductance Lqd obtained by partially differentiating the interlinkage flux of q-axis with respect to the current of d-axis, a value obtained by multiplying a time differential value of the current model response value of q-axis IqR to a q-axis current differential q-axis inductance Lqq obtained by partially differentiating the interlinkage flux of q-axis with respect to the current of q-axis, a value obtained by multiplying the electrical angle speed ω to the interlinkage flux corresponding to model response of d-axis ΨdcR, and a value obtained by multiplying the winding resistance value R to the current model response value of q-axis IqR. The block diagram of this case becomes as shown in FIG. 9.

If the winding resistance value R is small, and the term of the winding resistance value R of the right side first term of the equation (14) is sufficient small compared with other terms, this calculation processing of the term of the winding resistance value R may not be performed.

In the present embodiment, as shown in the equations (13), referring to a d-axis current differential d-axis inductance characteristic data Ldd(Id, Iq) whose input values are set to the current values of dq-axis Id, Iq and whose output value is set to the d-axis current differential d-axis inductance Ldd, a q-axis current differential d-axis inductance characteristic data Ldq(Id, Iq) whose input values are set to the current values of dq-axis Id, Iq and whose output value is set to the q-axis current differential d-axis inductance Ldq, a d-axis current differential q-axis inductance characteristic data Lqd(Id, Iq) whose input values are set to the current values of dq-axis Id, Iq and whose output value is set to the d-axis current differential q-axis inductance Lqd, and a q-axis current differential q-axis inductance characteristic data Lqq (Id, Iq) whose input values are set to the current values of dq-axis Id, Iq and whose output value is set to the q-axis current differential q-axis inductance Lqq, the two-axis voltage command calculation unit 35 calculates the d-axis current differential d-axis inductance Ldd, the q-axis current differential d-axis inductance Ldq, the d-axis current differential q-axis inductance Lqd, and the q-axis current differential q-axis inductance Lqq, corresponding to the current model response values of dq-axis IdR, IqR.

As the d-axis current differential d-axis inductance characteristic data, the q-axis current differential d-axis inductance characteristic data, the d-axis current differential q-axis inductance characteristic data, and the q-axis current differential q-axis inductance characteristic data, a map data or a high order function (for example, a polynomial, a neural network) is used, and is previously stored in the storage apparatus 91, such as ROM and EEPROM.

Figure 10:
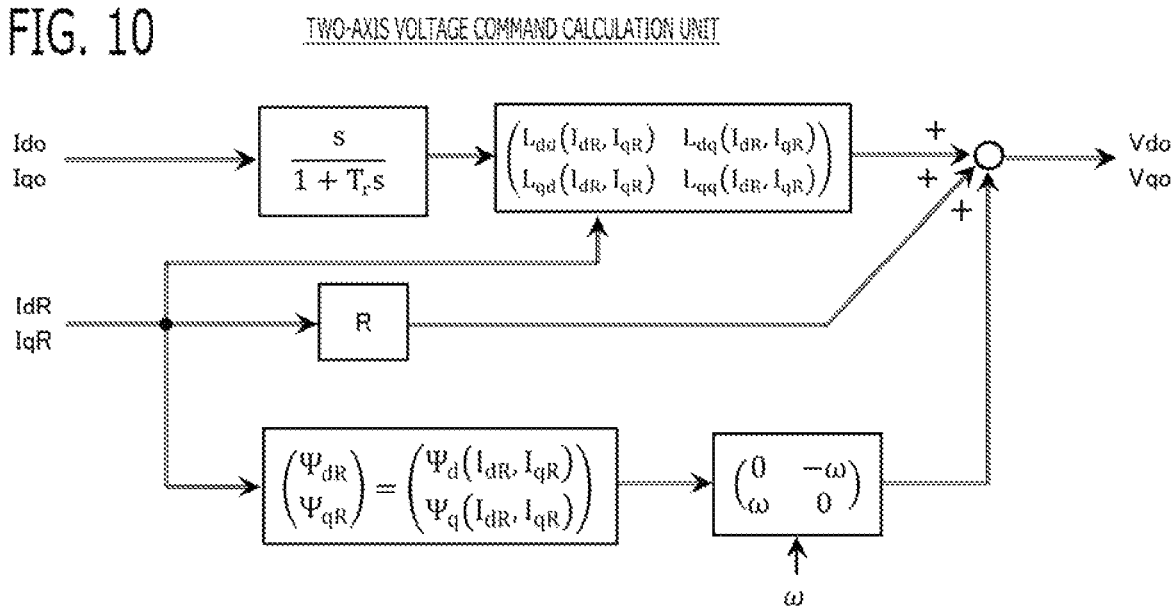
FIG. 10 is a block diagram of the two-axis voltage command calculation unit according to Embodiment 2.

Alternatively, as shown in the first line of the equation (15), the two-axis voltage command calculation unit 35 may calculate the time differential values of the current model response values of dq-axis IdR, IqR, by performing a calculation which combined the time differential and the response delay processing of the model response to the current command values of dq-axis Ido, Iqo. In this case, the combined whole transfer function may be discretized, or the equivalent conversion may be performed like the example of the second line of the equation (15). The block diagram of this case becomes as shown in FIG. 10.

According to this configuration, the time differential is not independently performed at the last, and by the combined calculation, calculation value is not excessively varied by the noise component and the variation component.

Alternatively, if the response delay processing of the model response is the filter processing of the first order lag, as shown in the second line of the equation (15), the two-axis voltage command calculation unit 35 may calculate the time differential value of the current model response value of d-axis IdR, by dividing a value obtained by subtracting the current model response value of d-axis IdR from the current command value of d-axis Ido, by the time constant Tr of the response delay processing of the model response; and may calculate the time differential value of the current model response value of q-axis IqR, by dividing a value obtained by subtracting the current model response value of q-axis IqR from the current command value of q-axis Iqo, by the time constant Tr of the response delay processing of the model response. The block diagram of this case becomes as shown in FIG. 11.

According to this configuration, by simple processing which subtracts the current model response values of dq-axis from the current command values of dq-axis, the time differential values of the current model response values of dq-axis can be calculated. Calculation processing load can be reduced, and calculation value can be prevented from varying excessively by the noise component and the variation component.

<Summary, Example of Conversion>

As described above, based on the current model response values of dq-axis IdR, IqR, the voltage command values of dq-axis Vdo, Vqo which make the current values of dq-axis Id, Iq change in the feedforward manner. Therefore, if there is no disturbance and no modeling error, the current values of dq-axis and the interlinkage fluxes of dq-axis can be changed with the model response. The torque which is generated according to the current values of dq-axis and the interlinkage fluxes of dq-axis also becomes the desirable response close to the model response.

In this feedforward controller, since the current sensor is not required, the cost for the current sensor can be suppressed. Since the detected current value of the current sensor is not used for control, there is no influence of delay, noise, and the like which occur in the detected current value.

The current sensor which detects currents flowing through three-phase windings may be provided, and the feedback control based on the current detection values may be performed. In this case, values obtained by adding the voltage command values of dq-axis Vdofb, Vqofb by the feedback control to the voltage command values of dq-axis Vdo, Vqo by the feedforward control mentioned above are calculated as the final voltage command values of dq-axis Vdo, Vqo. As the feedback control, the controller 1 converts the current detection values of three phases Iur, Ivr, Iwr into the current detection value of dq-axis Idr, Iqr, by performing the three-phase/two-phase conversion and the rotating coordinate conversion based on the magnetic pole position θ; and changes the feedback voltage command values of dq-axis Vdofb, Vqofb so that the current detection values of dq-axis Idr, Iqr approach the current model response values of dq-axis IdR, IqR. Alternatively, similar to JP 6687228 B, the controller 1 calculates interlinkage flux detection values of dq-axis Ψdr, Ψqr, based on the current detection values of dq-axis Idr, Iqr, using the current-interlinkage flux conversion characteristic data of dq-axis; and changes the feedback voltage command values of dq-axis Vdofb, Vqofb so that the interlinkage flux detection values of dq-axis Ψdr, Ψqr approach the interlinkage fluxes corresponding to model response of dq-axis ΨdcR, ΨqcR. By performing feedback together, robustness can be improved to disturbance and the modeling error. Other components, such as a harmonic wave component, may be added to the voltage command values of dq-axis Vdo, Vqo.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned embodiments, there was explained the case where it is three-phase of n=3. However, n may be set to two or more any natural numbers, for example, n=2 or 4.

(2) In each of the above-mentioned embodiments, there was explained the case where one set of the three-phase windings and the inverter is provided. However, two or more sets of the three-phase windings and the inverter may be provided, and the control similar to each Embodiment may be performed to each set of the three-phase windings and the inverter. In this case, in calculation of the voltage command values of dq-axis Vdo, Vqo, the term considering the interference between sets may be added.

(3) In each of the above-mentioned embodiments, there was explained the case where it is the embedded magnet type synchronous AC rotary electric machine. However, it may be a reluctance type synchronous AC rotary electric machine or a field winding type synchronous AC rotary electric machine. Alternatively, it may be a surface magnet type AC rotary electric machine. In the case of the surface magnet type, although the interdependency between the currents of dq-axis and the interlinkage flux reduces, there is a case where it does not become 0. Like each of above embodiments, by the control considering the interdependency between the currents of dq-axis and the interlinkage flux, control accuracy can be improved. Moreover, according to the same argument as JP 4161064 B, the control of present disclosure is applicable also to the induction rotary electric machine.

(4) In each of the above-mentioned embodiments, there was explained the case where change of the relationship between the current and the interlinkage flux due to change of magnet temperature is not considered. However, the change amount of the interlinkage flux due to temperature is estimated, or previously stored in the storage apparatus as characteristic data. By adding the change amount of the interlinkage flux when conversing between the current and the interlinkage flux, the change of the relationship between the current and the interlinkage flux due to the change of magnet temperature can be considered.

(5) In each of the above-mentioned embodiments, there was explained the case where the first order lag filter is used as the model response. However, various kinds of filters may be used as the model response, and the second order lag filter like the next equation may be used.

$$\begin{pmatrix} \Psi_{dR} \\ \Psi_{qR} \end{pmatrix} = \frac{\omega_n^2}{s^2 + 2\zeta\omega_n s + \omega_n^2} \begin{pmatrix} \Psi_{do} \\ \Psi_{qo} \end{pmatrix} \quad (17)$$

$$\begin{pmatrix} I_{dR} \\ I_{qR} \end{pmatrix} = \frac{\omega_n^2}{s^2 + 2\zeta\omega_n s + \omega_n^2} \begin{pmatrix} I_{do} \\ I_{qo} \end{pmatrix}$$

In this case, unlike the second line of the equation (8) and the second line of the equation (15) of the first order lag filter, equivalent conversion of the transfer function cannot be performed and it cannot be replaced to algebra calculation. Accordingly, as shown in the next equation, the differential operation and the response delay processing of the model response (in this example, the second order lag) may be calculated collectively, and each time differential may be calculated.

$$s \begin{pmatrix} \Psi_{dR} \\ \Psi_{qR} \end{pmatrix} = \frac{s\omega_n^2}{s^2 + 2\zeta\omega_n s + \omega_{f1}^2} \begin{pmatrix} \Psi_{do} \\ \Psi_{qo} \end{pmatrix} \quad (18)$$

$$s \begin{pmatrix} I_{dR} \\ I_{qR} \end{pmatrix} = \frac{s\omega_n^2}{s^2 + 2\zeta\omega_n s + \omega_n^2} \begin{pmatrix} I_{do} \\ I_{qo} \end{pmatrix}$$

In the case where the second order lag filter is used, unlike the first order lag filter, the change rate of the step response is 0 at t=0. Accordingly, the change rate of torque, that is, the change rate of acceleration (jerk) becomes more continuously. Therefore, if this configuration is applied for a vehicle application, since discontinuous change of jerk is suppressed more, it is hard to cause deterioration of riding comfort.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A controller for AC rotary electric machine that controls an AC rotary electric machine which is provided with armature windings of n phases (n is a natural number greater than or equal to two) via an inverter, the controller for AC rotary electric machine comprising at least one processor configured to:

detect or estimate an electrical angle and an electrical angle speed of a rotor of the AC rotary electric machine;

calculate interlinkage flux command values of a first-axis and a second-axis on a two-axis rotating coordinate system consisting of the first-axis and the second-axis which rotates synchronizing with rotation of the electrical angle of the rotor;

calculate interlinkage flux model response values of the first-axis and the second-axis by performing a response delay processing of a model response to the interlinkage flux command values of the first-axis and the second-axis;

calculate voltage command values of the first-axis and the second-axis which make interlinkage fluxes of the first-axis and the second-axis change to the interlinkage flux model response values of the first-axis and the second-axis in a feedforward manner, based on the interlinkage flux model response values of the first-axis and the second-axis, and the electrical angle speed;

calculate AC voltage command values of n phases which are voltage command values applied to the armature windings of n phases, based on the voltage command values of the first-axis and the second-axis, and the electrical angle; and control on/off plural switching devices provided in the inverter, based on the AC voltage command values of n phases.

2. The controller for AC rotary electric machine according to claim 1, wherein the processor is further configured to calculate the voltage command value of the first-axis, by totaling at least a time differential value of the interlinkage flux model response value of the first-axis, and a value obtained by multiplying the electrical angle speed and −1 to the interlinkage flux model response value of the second-axis; and calculate the voltage command value of the second-axis, by totaling at least a time differential value of the interlinkage flux model response value of the second-axis, and a value obtained by multiplying the electrical angle speed to the interlinkage flux model response value of the first-axis.

3. The controller for AC rotary electric machine according to claim 2, wherein the processor is further configured to calculate the time differential values of the interlinkage flux model response values of the first-axis and the second-axis, by performing a calculation which combined a time differential and the response delay processing of the model response, to the interlinkage flux command values of the first-axis and the second-axis.

4. The controller for AC rotary electric machine according to claim 2, wherein the processor further calculates the time differential value of the interlinkage flux model response value of the first-axis, by dividing a value obtained by subtracting the interlinkage flux model response value of the first-axis from the interlinkage flux command value of the first-axis, by a time constant of the response delay processing of the model response; and calculate the time differential value of the interlinkage flux model response value of the second-axis, by dividing a value obtained by subtracting the interlinkage flux model response value of the second-axis from the interlinkage flux command value of the second-axis, by the time constant of the response delay processing of the model response.

5. The controller for AC rotary electric machine according to claim 1, wherein the processor is further configured to calculate the voltage command value of the first-axis, by totaling a time differential value of the interlinkage flux model response value of the first-axis, a value obtained by multiplying the electrical angle speed and −1 to the interlinkage flux model response value of the second-axis, and a value obtained by multiplied a winding resistance value to a current value corresponding to model response of the first-axis which is a current value of the first-axis corresponding to the interlinkage flux model response values of the first-axis and the second-axis;

calculate the voltage command value of the second-axis, by totaling a time differential value of the interlinkage flux model response value of the second-axis, a value obtained by multiplying the electrical angle speed to the interlinkage flux model response value of the first-axis, and a value obtained by multiplying the winding resistance value to a current value corresponding to model response of the second-axis which is a current value of the second-axis corresponding to the interlinkage flux model response values of the first-axis and the second-axis; and using a current-interlinkage flux conversion characteristic data of the first-axis whose input values are set to the current values of the first-axis and the second-axis and whose output value is set to the interlinkage flux of the first-axis, and a current-interlinkage flux conversion characteristic data of the second-axis whose input values are set to the current values of the first-axis and the second-axis and whose output value is set to the interlinkage flux of the second-axis, search the current values corresponding to model response of the first-axis and the second-axis corresponding to the interlinkage flux model response values of the first-axis and the second-axis by iterative calculation.

6. The controller for AC rotary electric machine according to claim 5, wherein the processor is further configured to calculate performs the iterative calculation which does not use a slope information of an interlinkage flux with respect a current value.

7. The controller for AC rotary electric machine according to claim 5, wherein the processor is further configured to calculate sets initial values of the current values corresponding to model response of the first-axis and the second-axis for this time search, to the current values corresponding to model response of the first-axis and the second-axis which were searched last time.

8. The controller for AC rotary electric machine according to claim 1, wherein the processor is further configured to calculate the voltage command value of the first-axis, by totaling a time differential value of the interlinkage flux model response value of the first-axis, a value obtained by multiplying the electrical angle speed and −1 to the interlinkage flux model response value of the second-axis, and a value obtained by multiplied a winding resistance value to a current value corresponding to model response of the first-axis which is a current value of the first-axis corresponding to the interlinkage flux model response values of the first-axis and the second-axis;

calculate the voltage command value of the second-axis, by totaling a time differential value of the interlinkage flux model response value of the second-axis, a value obtained by multiplying the electrical angle speed to the interlinkage flux model response value of the first-axis, and a value obtained by multiplying the winding resistance value to a current value corresponding to model response of the second-axis which is a current value of the second-axis corresponding to the interlinkage flux model response values of the first-axis and the second-axis; and referring to an interlinkage flux-current conversion characteristic data of the first-axis whose input values are set to interlinkage fluxes of the first-axis and the second-axis and whose output value is set to a current value of the first-axis, and an interlinkage flux-current conversion characteristic data of the second-axis whose input values are set to interlinkage fluxes of the first-axis and the second-axis and whose output value is set to a current value of the second-axis, calculate the current values corresponding to model response of the first-axis and the second-axis corresponding to the interlinkage flux model response values of the first-axis and the second-axis.

9. The controller for AC rotary electric machine according to claim 1, wherein the processor is further configured to use a filter processing as the response delay processing of the model response.

10. A controller for AC rotary electric machine that controls an AC rotary electric machine which is provided with armature windings of n phases (n is a natural number greater than or equal to two) via an inverter, the controller for AC rotary electric machine comprising at least one processor configured to:

detect or estimate an electrical angle and an electrical angle speed of a rotor of the AC rotary electric machine;

calculate current command values of a first-axis and a second-axis on a two-axis rotating coordinate system consisting of the first-axis and the second-axis which rotate synchronizing with rotation of the electrical angle of the rotor;

calculate current model response values of the first-axis and the second-axis by performing a response delay processing of a model response to the current command values of the first-axis and the second-axis;

calculate interlinkage fluxes corresponding to model response of the first-axis and the second-axis based on the current model response values of the first-axis and the second-axis, and calculates voltage command values of the first-axis and the second-axis on the two-axis rotating coordinate system which make currents of the first-axis and the second-axis change to the current model response values of the first-axis and the second-axis in a feedforward manner, based on the current model response values of the first-axis and the second-axis, the interlinkage fluxes corresponding to model response of the first-axis and the second-axis, and the electrical angle speed; and calculate AC voltage command values of n phases which are voltage command values applied to the armature windings of n phases, based on the voltage command values of the first-axis and the second-axis, and the electrical angle; and control on/off plural switching devices provided in the inverter, based on the AC voltage command values of n phases; and wherein the processor is further configured to calculate the voltage command value of the first-axis, by totaling at least a value obtained by multiplying a time differential value of the current model response value of the first-axis to a first-axis current differential first-axis inductance obtained by partially differentiating an interlinkage flux of the first-axis with respect to a current of the first-axis, a value obtained by multiplying a time differential value of the current model response value of the second-axis to a second-axis current differential first-axis inductance obtained by partially differentiating an interlinkage flux of the first-axis with respect to a current of the second-axis, and a value obtained by multiplying the electrical angle speed and −1 to the interlinkage flux corresponding to model response of the second-axis; and calculate the voltage command value of the second-axis, by totaling at least a value obtained by multiplying a time differential value of the current model response value of the first-axis to a first-axis current differential second-axis inductance obtained by partially differentiating an interlinkage flux of the second-axis with respect to a current of the first-axis, a value obtained by multiplying a time differential value of the current model response value of the second-axis to a second-axis current differential second-axis inductance obtained by partially differentiating an interlinkage flux of the second-axis with respect to a current of the second-axis, and a value obtained by multiplying the electrical angle speed to the interlinkage flux corresponding to model response of the first-axis.

11. The controller for AC rotary electric machine according to claim 10, wherein, referring to a first-axis current differential first-axis inductance characteristic data whose input values are set to the current values of the first-axis and the second-axis and whose output value is set to the first-axis current differential first-axis inductance, a second-axis current differential first-axis inductance characteristic data whose input values are set to the current values of the first-axis and the second-axis and whose output value is set to the second-axis current differential first-axis inductance, a first-axis current differential second-axis inductance characteristic data whose input values are set to the current values of the first-axis and the second-axis and whose output value is set to the first-axis current differential second-axis inductance, and a second-axis current differential second-axis inductance characteristic data whose input values are set to the current values of the first-axis and the second-axis and whose output value is set to the second-axis current differential second-axis inductance, the processor is further configured to calculate the first-axis current differential first-axis inductance, the second-axis current differential first-axis inductance, the first-axis current differential second-axis inductance, and the second-axis current differential second-axis inductance, corresponding to the current model response values of the first-axis and the second-axis.

12. The controller for AC rotary electric machine according to claim 10, wherein the processor is further configured to calculate time differential values of the current model response values of the first-axis and the second-axis, by performing a calculation which combined a time differential and the response delay processing of the model response, to the current command values of the first-axis and the second-axis.

13. The controller for AC rotary electric machine according to claim 10, wherein the processor is further configured to calculate time differential value of the current model response value of the first-axis, by dividing a value obtained by subtracting the current model response value of the first-axis from the current command value of the first-axis, by a time constant of the response delay processing of the model response; and calculate the time differential value of the current model response value of the second-axis, by dividing a value obtained by subtracting the current model response value of the second-axis from the current command value of the second-axis, by the time constant of the response delay processing of the model response.

14. A controller for AC rotary electric machine that controls an AC rotary electric machine which is provided with armature windings of n phases (n is a natural number greater than or equal to two) via an inverter, the controller for AC rotary electric machine comprising at least one processor configured to:

detect or estimate an electrical angle and an electrical angle speed of a rotor of the AC rotary electric machine;

calculate current command values of a first-axis and a second-axis on a two-axis rotating coordinate system consisting of the first-axis and the second-axis which rotate synchronizing with rotation of the electrical angle of the rotor;

calculate current model response values of the first-axis and the second-axis by performing a response delay processing of a model response to the current command values of the first-axis and the second-axis;

calculate interlinkage fluxes corresponding to model response of the first-axis and the second-axis based on the current model response values of the first-axis and the second-axis, and calculates voltage command values of the first-axis and the second-axis on the two-axis rotating coordinate system which make currents of the first-axis and the second-axis change to the current model response values of the first-axis and the second-axis in a feedforward manner, based on the current model response values of the first-axis and the second-axis, the interlinkage fluxes corresponding to model response of the first-axis and the second-axis, and the electrical angle speed; and calculate AC voltage command values of n phases which are voltage command values applied to the armature windings of n phases, based on the voltage command values of the first-axis and the second-axis, and the electrical angle; and control on/off plural switching devices provided in the inverter, based on the AC voltage command values of n phases;

wherein, referring to a current-interlinkage flux conversion characteristic data of the first-axis whose input values are set to the current values of the first-axis and the second-axis and whose output value is set to the interlinkage flux of the first-axis, and a current-interlinkage flux conversion characteristic data of the second-axis whose input values are set to the current values of the first-axis and the second-axis and whose output value is set to the interlinkage flux of the second-axis, the processor is further configured to calculate the interlinkage fluxes corresponding to model response of the first-axis and the second-axis which are the interlinkage fluxes of the first-axis and the second-axis corresponding to the current model response values of the first-axis and the second-axis.

15. The controller for AC rotary electric machine according to claim 10, wherein the processor is further configured to use a filter processing as the response delay processing of the model response.

* * * * *